(12) United States Patent
Ueyama

(10) Patent No.: US 8,531,586 B2
(45) Date of Patent: Sep. 10, 2013

(54) IMAGE PICKUP APPARATUS AND STORAGE MEDIUM INCLUDING FOCUS LENS CONTROL

(75) Inventor: Teruhiko Ueyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 729 days.

(21) Appl. No.: 12/186,004

(22) Filed: Aug. 5, 2008

(65) Prior Publication Data

US 2009/0040341 A1    Feb. 12, 2009

(30) Foreign Application Priority Data

Aug. 8, 2007  (JP) .................................. 2007-207028

(51) Int. Cl.
*G03B 13/00* (2006.01)
*H04N 5/232* (2006.01)

(52) U.S. Cl.
USPC ......................................... 348/347

(58) Field of Classification Search
USPC .................... 348/347, 363; 396/64
See application file for complete search history.

(56) References Cited

U.S. PATENT DOCUMENTS

| 5,341,190 | A * | 8/1994 | Ogawa .............................. 396/85 |
| 6,636,263 | B2 * | 10/2003 | Oda ................................ 348/370 |
| 2006/0140607 | A1 * | 6/2006 | Sumi ................................ 396/79 |

FOREIGN PATENT DOCUMENTS

| JP | 5-134163 A | | 5/1993 |
| JP | 10-164417 A | | 6/1998 |
| JP | 2002-267920 | * | 9/2002 |
| JP | 2002-267920 A | | 9/2002 |
| JP | 2006146059 | * | 6/2006 |
| JP | 2006-184580 A | | 7/2006 |

OTHER PUBLICATIONS

Japanese office action corresponding application No. JP2007-207028, issued Sep. 22, 2011.

* cited by examiner

*Primary Examiner* — Albert Cutler
(74) *Attorney, Agent, or Firm* — Rossi, Kimms & McDowell LLP

(57) ABSTRACT

An image pickup apparatus which is capable of being downsized and being power-saved, and is capable of following the focal plane and controlling the exposure during the variably-magnifying operation. There is stored information on a position of a focus lens corresponding to a position of a zoom lens, which is dependent on an object distance. The focus lens is moved based on the stored information when the zoom lens is moved. When a moving direction of the zoom lens is switched, the focus lens is stopped, and then the moving direction of the zoom lens is switched. The focus lens is moved based on the stored information after the switching.

3 Claims, 9 Drawing Sheets

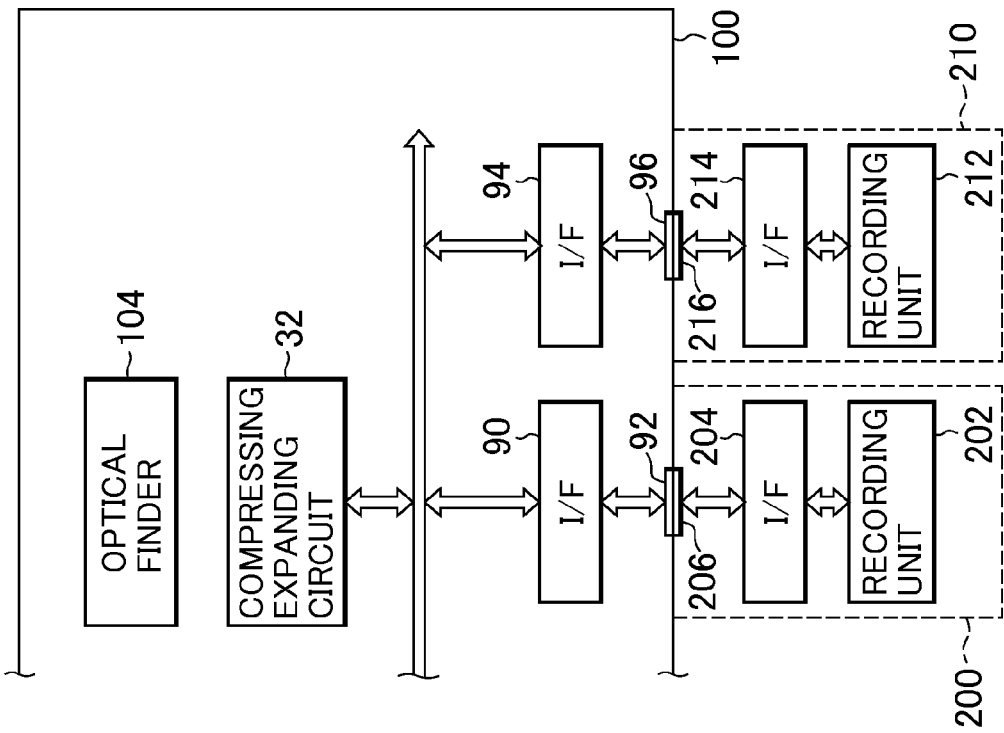

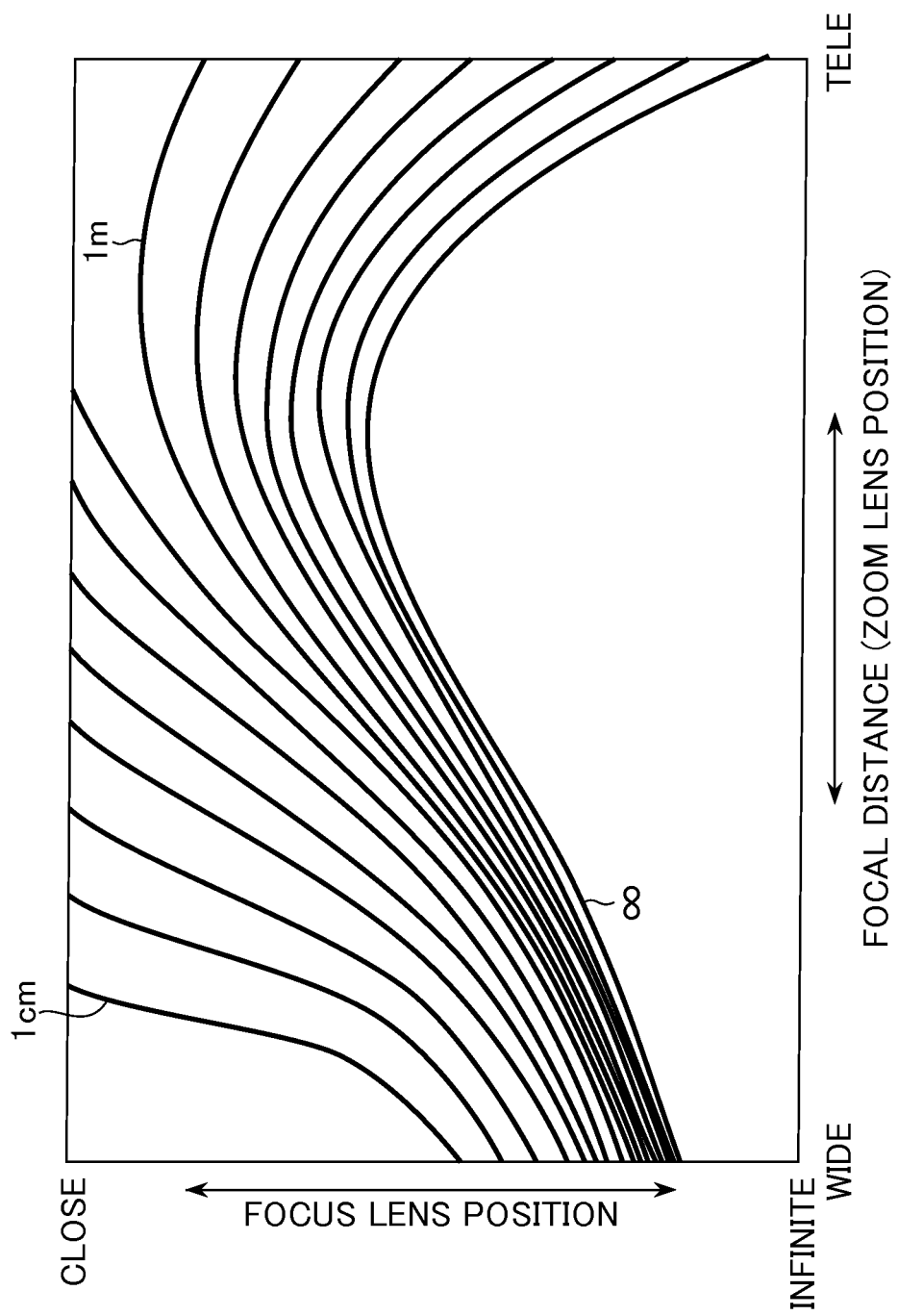

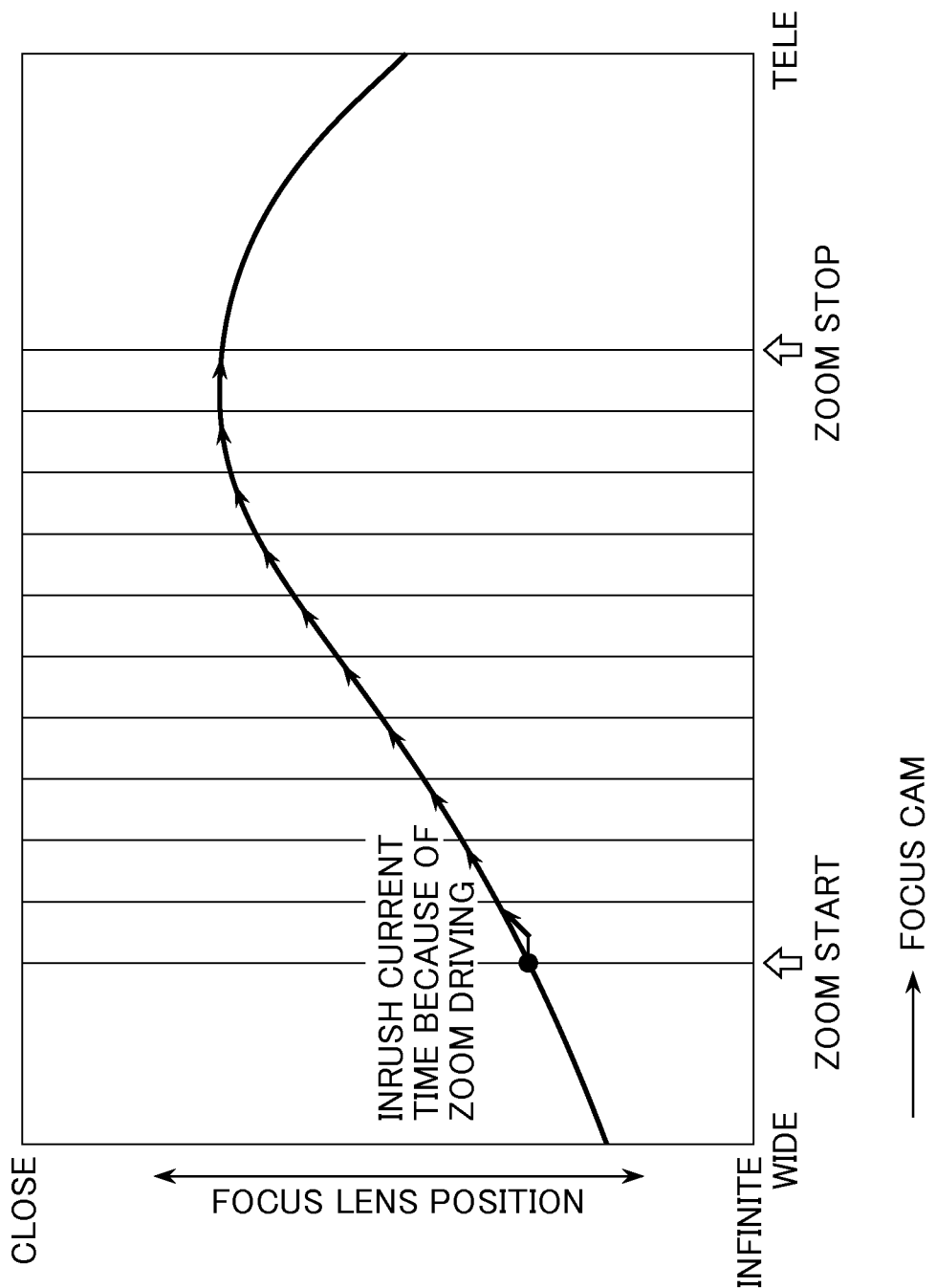

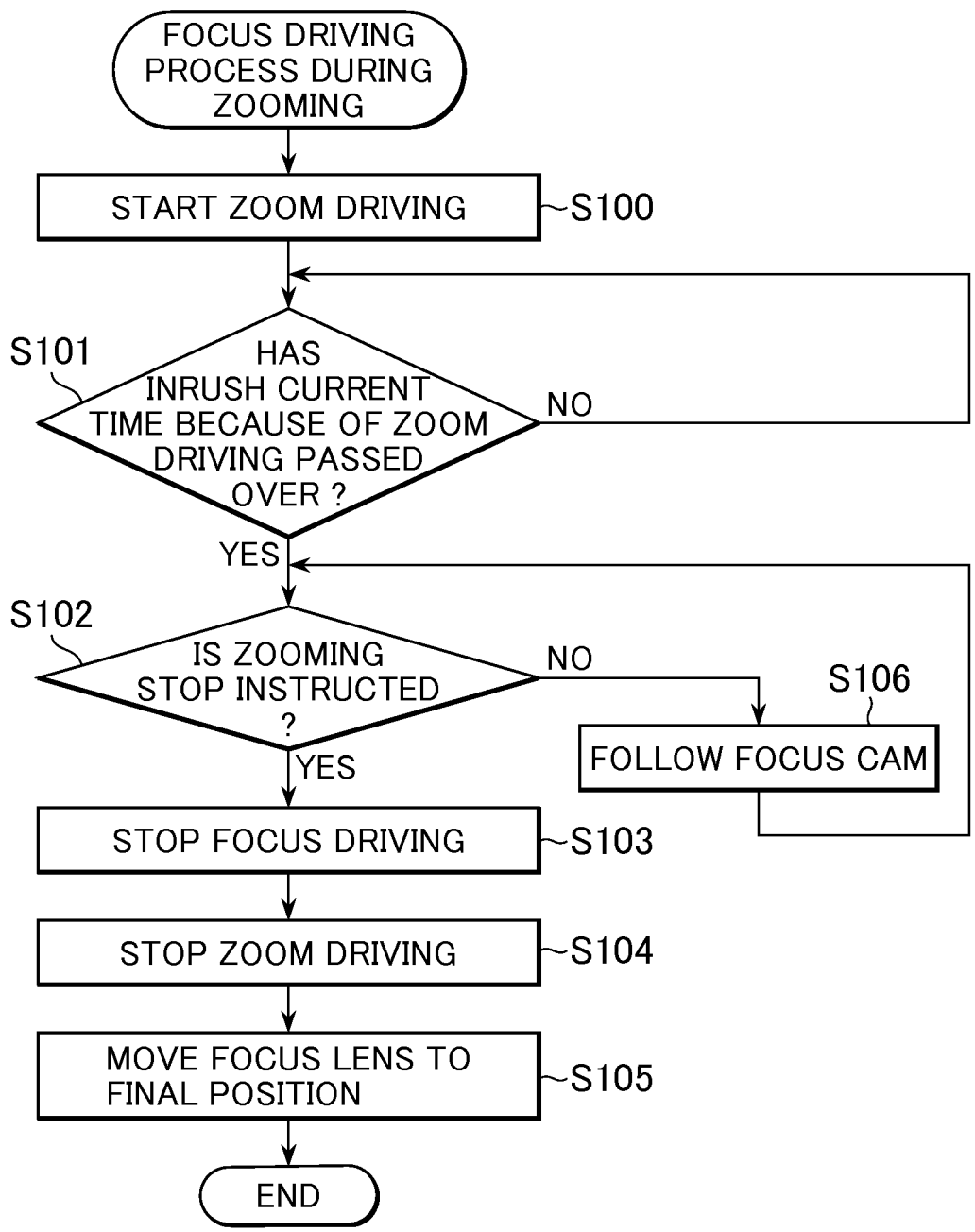

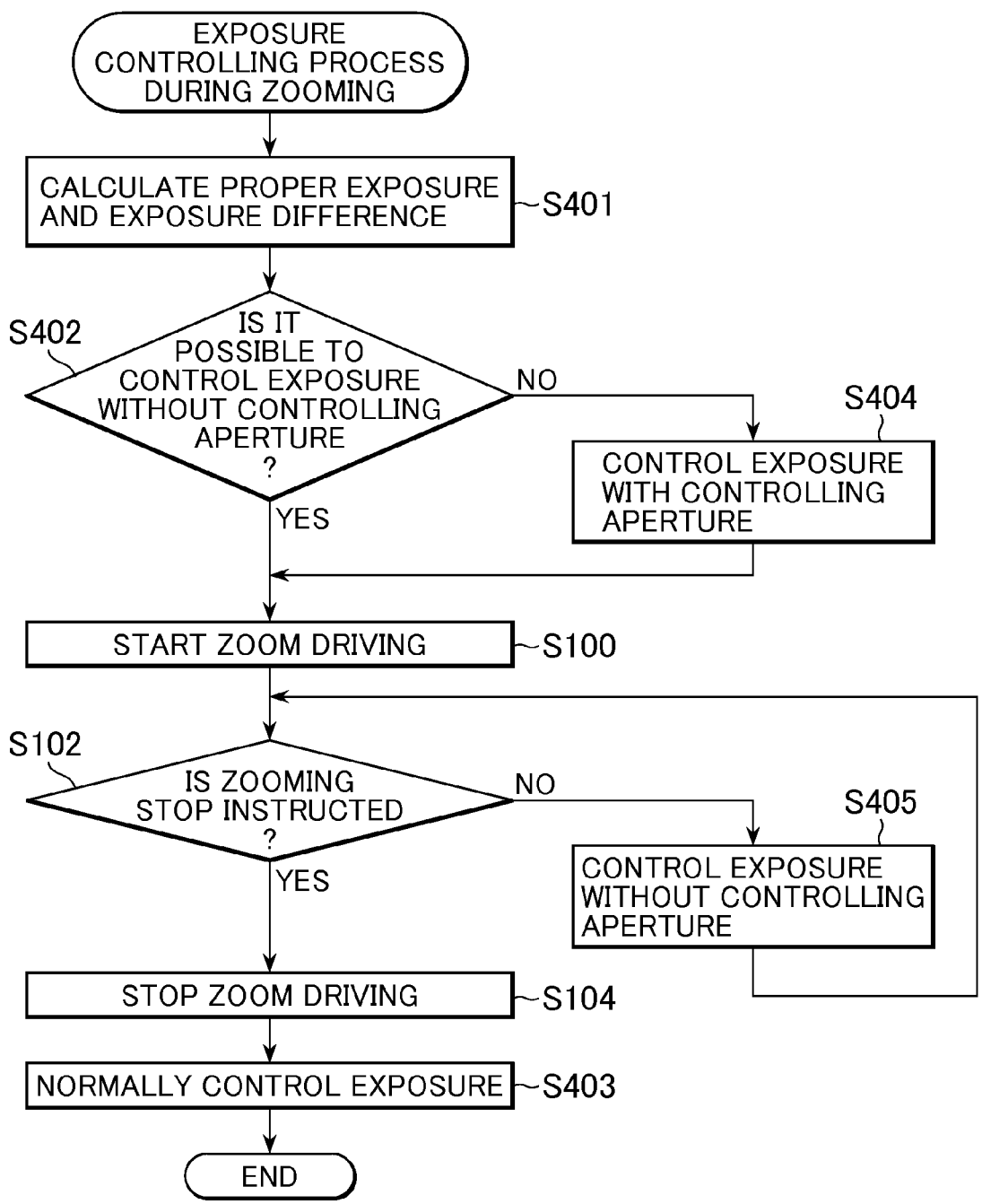

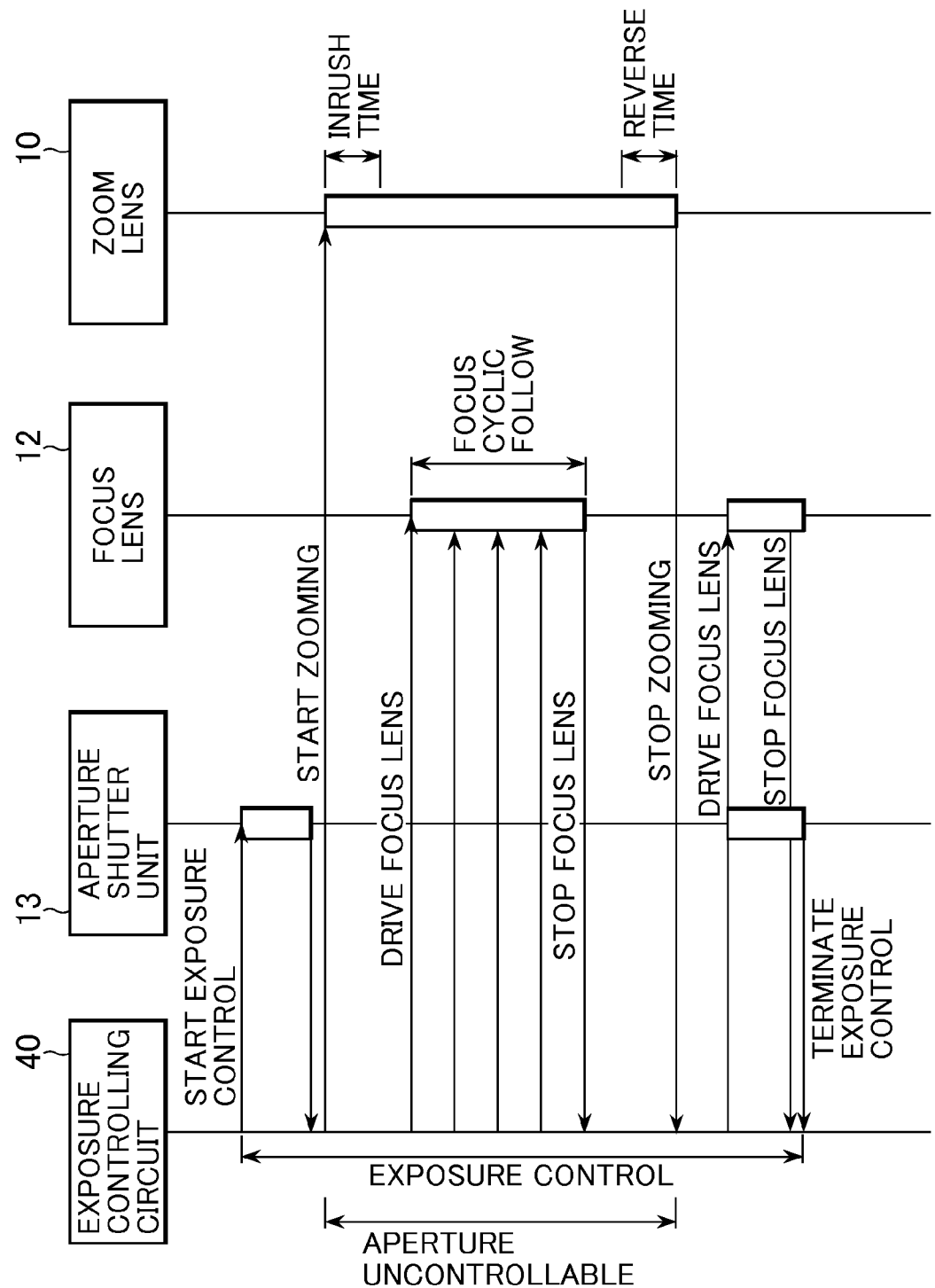

IMAGE PICKUP APPARATUS AND STORAGE MEDIUM INCLUDING FOCUS LENS CONTROL

BACKGROUND OF THE INVENTION

1. Field of the Invention

The present invention relates to an image pickup apparatus including a variably-magnifying function which variably-magnifies an object image with a zoom lens, and the like, and a focus correcting function which corrects a focal plane displaced by the variably-magnifying function, and a storage medium storing a control program for controlling the image pickup apparatus.

2. Description of the Related Art

Conventionally, there has been widely known an image pickup apparatus provided with an imaging element, and a zooming function (variably-magnifying function) which moves a group of a plurality of lenses in an optical axis direction to variably-magnify.

In recent years, in such an image pickup apparatus, a request for a high-power variable-magnification lens has been particularly increased. Since a focal plane is widely moved in a variably-magnifying operation by using the high-power variable-magnification lens, it is desirable to cause the high-power variable-magnification lens to follow while correcting the focal plane along with the variably-magnifying operation.

Thus, an image pickup apparatus has been proposed which also maintains a focused condition after a zooming direction is reversed by correcting a difference of cam excursion data, which is induced because the zooming direction is different when a driving direction of the zooming is reversed, with a predetermined difference correction quantity corresponding to the zooming direction (for example, refer to Japanese Laid-Open Patent Publication (Kokai) No. H5-134163).

Since an f-value change of the high-power lens is large because of the variable-magnification, it is desirable to also control the exposure by the changed f-value during the variably-magnifying.

On the other hand, since the image pickup apparatus including a mechanism and a control of the above conventional example is frequently used as being carried, it is desirable that the image pickup apparatus is a small size-type, and a power saving-type.

Generally, if the high-power lens is downsized, the f-value change is enlarged. To power-save the apparatus in addition to the downsizing, it is general to lower a driving voltage of the apparatus, and to downsize a battery.

According to a technique of the above Japanese Laid-Open Patent Publication (Kokai) No. 5-134163, the image pickup apparatus is controlled to maintain the focused condition as correcting a focus even when a driving direction is reversed during the zooming. However, if a peak current flowing when the zooming is reversed is added with a driving current for the focusing, a driving current for the aperture, a driving current for a ND filter, and the like, it is difficult to achieve power saving due to the effect of a drop in the power supply voltage. As a result, it is not easy to realize the image pickup apparatus which is a small size-type, and a power saving-type.

Since there exists an exposure difference, and the like because of the focal plane change and the f-value change during the variably-magnifying operation, it has been particularly difficult to downsize and power-save the image pickup apparatus configured with the high-power variable-magnification lens.

SUMMARY OF THE INVENTION

The present invention provides the an image pickup apparatus which is capable of being downsized and being power-saved, and is capable of following the focal plane and controlling the exposure during the variably-magnifying operation, and a storage medium.

In a first aspect of the present invention, there is provided an image pickup apparatus comprising a storing unit adapted to store information on a position of a focus lens corresponding to a position of a zoom lens, the position of the focus lens being dependent on an object distance, and a controlling unit adapted to move the focus lens based on the information stored in the storing unit when the zoom lens is moved. When a moving direction of the zoom lens is switched, the controlling unit is adapted to stop the focus lens to switch the moving direction of the zoom lens, and the controlling unit is adapted to move the focus lens based on the information stored in the storing unit after the switching.

In a second aspect of the present invention, there is provided an image pickup apparatus comprising an imaging element, and an exposure controlling unit adapted to control a level of an output signal from the imaging element by causing at least one of a shutter controlling unit adapted to control a charge storage time of the imaging element, an aperture adapted to control an incident light quantity to the imaging element, and a gain controlling unit adapted to amplify the output signal from the imaging element to operate, and the exposure controlling unit is adapted to prohibits the aperture from being driven and controls the exposure with the shutter controlling unit and the gain controlling unit while the zoom lens is moving.

In a third aspect of the present invention, there is provided a computer-readable storing medium storing a control program for controlling an image pickup apparatus, the control program comprising a storing module for storing information on a position of a focus lens corresponding to a position of a zoom lens, the position of the focus lens being dependent on an object distance, and a controlling module for moving the focus lens based on the information stored by the storing module when the zoom lens is moved. When a moving direction of the zoom lens is switched, the controlling module stops the focus lens to switch the moving direction of the zoom lens, and the controlling module moves the focus lens based on the information stored by the storing module after the switching.

According to the present invention, it is possible to downsize and power-save, and to follow the focal plane and control the exposure during the variably-magnifying operation.

Further features of the present invention will become apparent from the following detailed description of exemplary embodiments with reference to the attached drawings.

BRIEF DESCRIPTION OF THE DRAWINGS

FIGS. 1A and 1B are a block diagram schematically showing a configuration of an image pickup apparatus according to an embodiment of the present invention.

FIG. 2 is a diagram illustrating a focus cam excursion illustrating a position of a focus lens for a position (a focal distance) of a zoom lens in FIG. 1A.

FIG. 3 is a diagram illustrating an example of a relative operation control of the focus lens for the zoom lens during the zooming operation in FIG. 1A.

FIG. 4 is a flowchart illustrating a procedure of a focus driving (driving the focus lens) process, which is executed by the image pickup apparatus in FIGS. 1A and 1B, during the zooming operation (driving the zoom lens).

FIG. 7 is a flowchart illustrating a procedure of an exposure controlling process, which is executed by the image pickup apparatus in FIGS. 1A and 1B, while the zooming operation is executed.

FIG. 8 is a timing chart when the zooming operation is executed in the image pickup apparatus in FIGS. 1A and 1B.

DETAILED DESCRIPTION OF THE EMBODIMENTS

The present invention will now be described in detail with reference to the drawings showing preferred embodiments thereof.

Figure 1A:
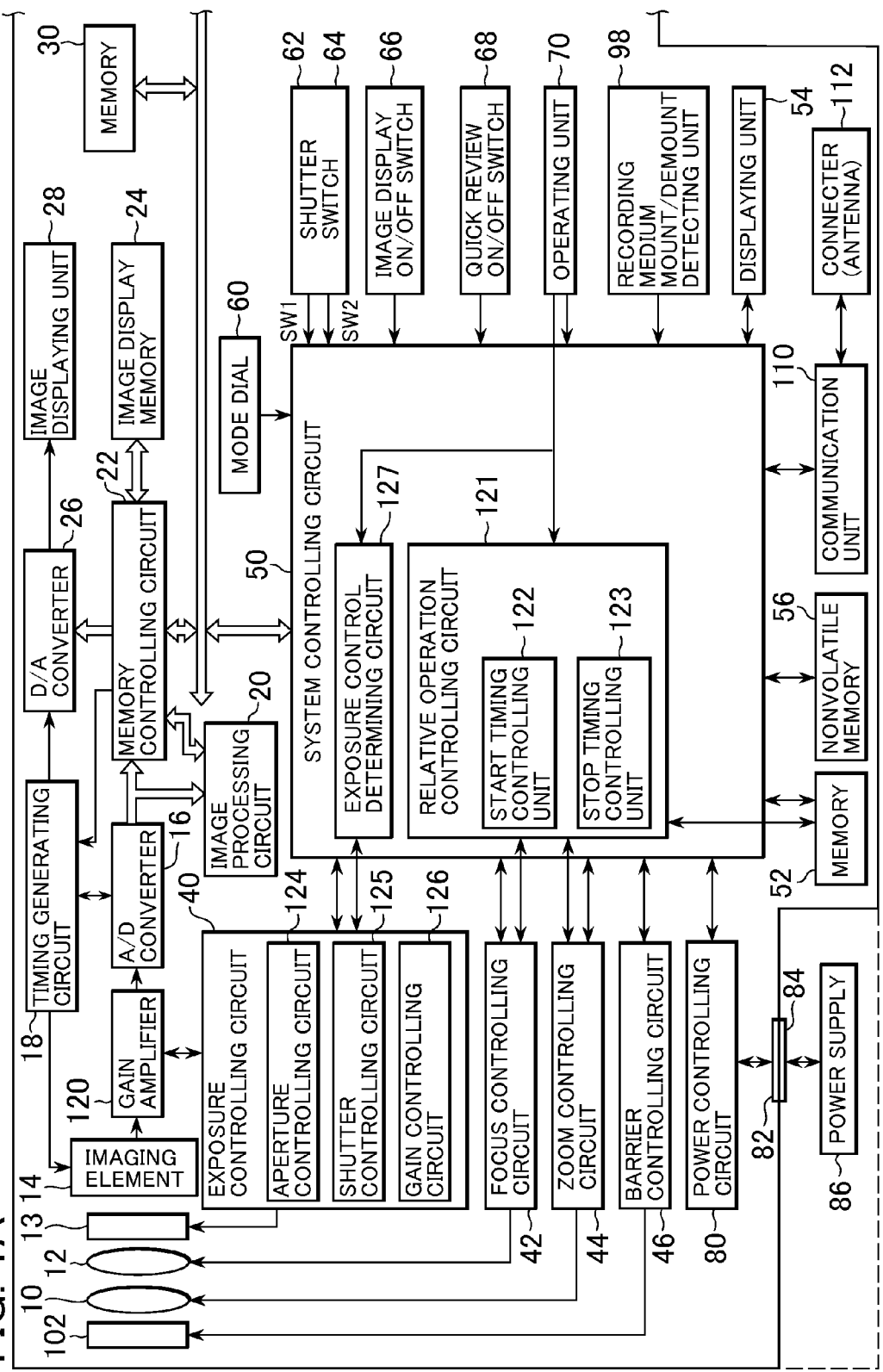

FIGS. 1A and 1B are a block diagram schematically showing a configuration of an image pickup apparatus according to an exemplary embodiment of the present invention.

In FIGS. 1A and 1B, an image pickup apparatus 100 is comprised of a variable-magnification lens (hereinafter, referred to as a zoom lens) 10, a focal lens (hereinafter, referred to as a focus lens) 12, an aperture shutter unit 13 in which an aperture and a shutter are incorporated, and an imaging element 14 which converts an optical image to an electrical signal.

The image pickup apparatus 100 is also comprised of a gain amplifier 120 that amplifies an analog signal output of the imaging element 14 to set the sensitivity of a camera, an A/D converter 16 that converts the analog signal output of the imaging element 14 to a digital signal.

Further, the image pickup apparatus 100 is also comprised of a timing generating circuit 18 that delivers a clock signal and a control signal to the imaging element 14, the A/D converter 16, and a D/A converter 26. The timing generating circuit 18 is controlled by a memory controlling circuit 22 and a system controlling circuit 50.

In addition, the image pickup apparatus 100 is comprised of an image processing circuit 20 that executes a predetermined pixel interpolating process and a predetermined color converting process for data from the A/D converter 16 or data from the memory controlling circuit 22.

The image processing circuit 20 executes a predetermined calculating process by using the imaged image data. Based on the obtained calculation result, the system controlling circuit 50 executes an AF (Auto-Focus) process, an AE (Automatic Exposure) process, and an EF (flash previous light-emission) process in a TTL (Through The Lens) method for controlling an exposure controlling circuit 40 and a focus controlling circuit 42.

In addition, the image processing circuit 20 executes the predetermined calculating process by using the imaged image data, and based on the obtained result, the image processing circuit 20 also executes an AWB (Auto-White Balance) process in the TTL method.

The memory controlling circuit 22 controls the A/D converter 16, the timing generating circuit 13, the image processing circuit 20, an image display memory 24, the D/A converter 26, a memory 30, and a compressing/expanding circuit 32.

Data of the A/D converter 16 is written in the image display memory 24 or the memory 30 through the image processing circuit 20 and the memory controlling circuit 22, or directly through the memory controlling circuit 22.

The system controlling circuit 50, which controls the entire image pickup apparatus 100, calculates an proper exposure value to control the exposure controlling circuit 40 based on a brightness level which is optically-measured by the TTL method through the memory controlling circuit 22.

Image data for the display, which is written in the image display memory 24, is displayed by an image displaying unit 28 composed of a TFT, an LCD, and the like through the D/A converter 26. If the imaged image data is sequentially displayed by using the image displaying unit 28, an electronic finder function can be realized.

The image displaying unit 28 can arbitrarily turn on/off the display according to an instruction of the system controlling circuit 50, and when the display is turned off, it is possible to largely reduce the power consumption of the image pickup apparatus 100.

The memory 30 is used to is store an imaged still image and an imaged moving image, and has a enough amount of memories to store a predetermined number of still images and a predetermined time of moving image. This makes it possible to write a large number of images in the memory 30 at a high rate, even in the case of a continuous imaging for continuously imaging a plurality of numbers of still images, or a panorama imaging.

The memory 30 can be also used as a working area for the system controlling circuit 50. The memory 30 functions as a storing unit which stores relative information on the focus controlling circuit 42 for the operation of a zoom controlling circuit 44 as a variably-magnifying unit which variably-magnifies an object image.

The compressing/expanding circuit 32, which compresses and expands image data with the adaptive discrete cosine transform (ADCT), or the like, reads an image stored in the memory 30 to executes a compressing process or a expanding process, and writes the processed data in the memory 30.

A memory 52 stores a constant number, a variable number, a program, and the like for an operation of the system controlling circuit 50. The exposure controlling circuit 40 includes an aperture controlling circuit 124 and a shutter controlling circuit 125 that control the aperture shutter unit 13 having an aperture function and a shutter function, and a gain controlling circuit 126 that controls the gain amplifier 120 setting the sensitivity of a camera.

Specifically, the aperture controlling circuit 124 controls an incident light quantity to the imaging element 14. The shutter controlling circuit 125 controls a charge storage time of the imaging element 14. The gain controlling circuit 126 amplifies an output signal from the imaging element 14 to amplify a signal level.

The focus controlling circuit 42 controls the focusing for the focus lens 12. The zoom controlling circuit 44 controls the zooming for the zoom lens 10. A barrier controlling circuit 46 controls an operation of a protective component 102 which is a barrier.

The exposure controlling circuit 40 and the focus controlling circuit 42 are controlled by using the TTL method, and based on a calculation result obtained by calculating the imaged image data in the image processing circuit 20, the system controlling circuit 50 controls the exposure controlling circuit 40 and the focus controlling circuit 42.

An exposure control determining circuit 127, which is included in the system controlling circuit 50, determines whether or not it is necessary to control the exposure with an aperture function of the aperture shutter unit 13 to control the exposure before a variably-magnifying unit is operated, when the variably-magnifying operation is executed by an operating unit 70. When it is necessary to control the exposure, the exposure control determining circuit 127 controls the aperture controlling circuit 124, the shutter controlling circuit 125, and the gain controlling circuit 126 so that the exposure becomes an proper exposure value with a desired aperture diameter.

A relative operation controlling circuit 121, which is included in the system controlling circuit 50, reads relative information stored in the memory 30, on the zoom lens 10 and the focus lens 12, when the variably-magnifying operation is executed by the operating unit 70. Based on the relative information, the relative operation controlling circuit 121 controls the focus lens 12 so that the focus lens 12 is positioned at a relative position according to a position of the zoom lens 10.

A start timing controlling circuit 122 of the relative operation controlling circuit 121 controls a control start timing which is used when controlling according to the relative information. A stop timing controlling circuit 123 of the relative operation controlling circuit 121 controls a stop timing of the focus lens 12 when a driving direction of the zoom lens 10 is switched during the relative operation.

A displaying unit 54 has a liquid crystal displaying apparatus (LCD) that displays an operation condition, a message, and the like by using a character, an image, sound, and the like in response to an execution of a program by the system controlling circuit 50, a speaker, and the like. The displaying unit 54 is disposed at one position or a plurality of positions in which the displaying unit 54 is easily viewed around an operating unit of the image pickup apparatus 100. A partial function of the displaying unit 54 is allocated in an optical finder 104.

In display contents of the displaying unit 54, displayed in the LCD and the like are the contents corresponding to a single shot/continuous shots imaging display, a self timer display, a compression ratio display, a number of recorded pixels display, a number of recorded images display, a number of remaining imageable images display, a shutter speed display, an aperture value display, an exposure correction display, and the like.

Further, displayed in the LCD and the like are the contents corresponding to an LED light-emission mode display, a red-eye reduction display, a macro imaging display, a buzzer setting display, a clock battery remaining quantity display, a battery remaining quantity display, an error display, an information display with a plurality of digits, and the like. In addition, displayed in the LCD and the like are the contents corresponding to a mount/dismount condition display for a storage unit 200 or 210, a communication I/F operation display, a date/time display, and the like.

In display contents of the displaying unit 54, displayed in the optical finder 104 are the contents corresponding to a focusing display, a camera shake warning display, a strobe charging display, a shutter speed display, an aperture value display, an exposure correction display, and the like.

A nonvolatile memory 56, which is electrically erasable and recordable, is formed by an EEPROM, for example. Shutter switches 62 and 64, an image display on/off switch 66, a quick review on/off switch 68, and the operating unit 70, which are used to input a variety of operation instructions of the system controlling circuit 50, are constituted of one component or a combination of a plurality of components such as a switch or a dial, a touch panel, a pointing by a sight line detection, and a voice recognition apparatus, respectively. Here, such operation components will be specifically described.

The shutter switch 62 (SW1) is turned on while a not-illustrated shutter switch component is being operated, and instructs to start an imaging preparing operation such as the AF (Auto-Focus) process, the AE (Automatic Exposure) process, the AWB (Auto-White Balance) process, and the EF (strobe previous light-emission).

When the not-illustrated shutter switch component has been operated, the shutter switch 64 (SW2) is turned on, and instructs to start a series of processes. The series of processes correspond to an exposure process which writes a signal read from the imaging element 14 in the memory 30 through the A/D converter 16 and the memory controlling circuit 22, and a developing process which uses the calculation in the image processing circuit 20 or the memory controlling circuit 22. The series of processes correspond to a recording process which reads the image data from the memory 30, compresses the image data in the compressing/expanding circuit 32, and writes the image data in the storage unit 200 or 210.

The image display on/off switch 66 has a function which can set on/off of the image displaying unit 28. By using this function, when imaging by using the optical finder 104, it becomes to power-save by interrupting the power supply to the image displaying unit 28 composed of a TFT, an LCD, or the like.

The quick review on/off switch 68 sets a quick review function which automatically reproduces the imaged image data just after the imaging. In the present embodiment, it is particularly assumed that the quick review on/off switch 68 has a function which sets the quick review function when the image displaying unit 28 is turned off.

A mode dial 60 can select a setting corresponding to a variety of photographing scenes, such as an auto mode and a program mode, an aperture priority mode, a shutter speed priority mode, a night scene mode and a child photographing mode, a fireworks photographing mode, and an underwater photographing mode.

The operating unit 70 configured with a variety of buttons, a touch panel, and the like includes a menu button, a set button, a macro button, a multi- screen reproduction page back button, a strobe setting button, and a single shot/continuous shot/self timer switching button.

In addition, the operating unit 70 includes a menu change + (plus) button, a menu change – (minus) button, a reproduction image change + (plus) button, a reproduction image change – (minus) button, an imaging quality selecting button, an exposure correcting button, and a date/time setting button.

A power controlling circuit 80 is composed of a battery detecting circuit, a DC-DC converter, a switching circuit which switches a block to be power-distributed, and the like, not shown. The power controlling circuit 80, detecting the existence of the mounted battery, a type of the battery, a remaining quantity of the battery, a power voltage, and the like, controls the DC-DC converter based on the detection result and an instruction of the system controlling circuit 50, and supplies each unit including a recording medium with a necessary voltage for a necessary term.

A power supply 86 is composed of a primary battery such as an alkaline battery and a lithium battery, a secondary battery such as a NiCd battery, a NiMH battery, and a Li battery, an AC adapter, and the like. The power controlling circuit 80 and the power supply 86 are connected to each other through connectors 82 and 84.

The image pickup apparatus 100 is comprised of interfaces (I/F) 90 and 94 to the storage units 200 and 210 such as a memory card, a hard disk and the like, and connectors 92 and 96 which are connected to the storage units 200 and 210, respectively. The image pickup apparatus 100 is comprised of a recording medium mount/dismount detecting unit 98 that detects whether or not the storage unit 200 or 210 is connected to the connectors 92 and/or 96.

In the present embodiment, it is assumed that image pickup apparatus 100 has two systems in which interfaces and connectors to which the storage units 200 and 210 are connected. The image pickup apparatus 100 may be configured to have one system or a plurality of systems, or any number of systems of interfaces and connectors to which the storage units 200 and 210 are connected. The image pickup apparatus 100 may be configured to have a combination of interfaces and connectors whose standards are different.

The interfaces and connectors may be composed of interfaces and connectors each of which conforms to a standard such as the PCMCIA card and the Secure Digital (small storing apparatus (SD: registered trademark)) card.

When the interfaces 90 and 94, and the connectors 92 and 96 are composed of interfaces and connectors which conforms to the standard such as the PCMCIA card and the Secure Digital card, the following advantage can be obtained by connecting a variety of communication cards. That is, it is possible to mutually communicate image data and management information on the image data with another peripheral apparatus such as a computer and a printer. Each of communication cards may be composed of the LAN card and a modem card, the USB card, the IEEE 1394 card, the P1284 card, the SCSI card, the PHS, or the like.

The protective component 102, which is a barrier, covers an imaging unit including the zoom lens 10 of the image pickup apparatus 100 to prevent the imaging unit from being smeared or damaged. The optical finder 104 can image without using the electronic finder function by the image displaying unit 28.

The partial functions of the displaying unit 54 are provided in the optical finder 104, such as the focusing display, the camera shake warning display, the strobe charging display, the shutter speed display, the aperture value display, the exposure correction display.

A communication device 110 includes a variety of communicating functions such as the RS 232C, the USB, the IEEE1394, the P1284, the SCSI, the modem, the LAN, a wireless communication. A connector (an antenna in the case of wireless communication) 112 connects the image pickup apparatus 100 to another apparatus through the communication device 110.

The storage unit 200 includes a recording unit 202 composed of a semiconductor memory, a magnetic disk, and the like, an interface (I/F) 204 for connection to the image pickup apparatus 100, and a connector 206 that is connected to the image pickup apparatus 100.

The storage unit 210 includes a recording unit 212 composed of a semiconductor memory, a magnetic disk, and the like, an interface (I/F) 214 for connection to the image pickup apparatus 100, and a connector 216 that is connected to the image pickup apparatus 100.

Next, a controlling method for the focus lens 12 will be described when the object image is variably-magnified by the zoom lens 10 by using FIG. 1A to FIG. 6.

Generally, the zoom lens 10 moves in a direction of an optical axis to variably-magnify the object image. Similarly to the zoom lens 10, the focus lens 12 also moves in an optical axis direction to move the focal plane.

FIG. 2 is a diagram illustrating a focus cam excursion illustrating a position of the focus lens 12 for a position (focal distance) of the zoom lens 10 in FIG. 1A.

When the focal distance is not changed, that is, when the zoom lens 10 is stopped, since the focus lens 12 moves in parallel to an ordinate axis on the corresponding focal distance (abscissa axis) of FIG. 2, the focus can be adjusted.

While the zooming operation is executed, the excursion of the focus lens 12 is selected from FIG. 2 according to each object distance. By applying the drive control, which corresponds to the change of the focal distance, to the focus lens 12 as following this excursion, it is possible to zoom while correcting the focal plane and realizing the focus adjustment function because of the variable-magnification, to thereby obtain an unblurred a video image signal during the zooming operation.

FIG. 3 is a diagram illustrating an example of a relative operation control of the focus lens 12 for the zoom lens 10 during the zooming in FIG. 1A. The definition of ordinates and abscissa is the same as that of FIG. 2.

When it is started to drive the zoom lens 10, the relative operation controlling circuit 121 obtains a zoom lens position (focal distance), and obtains a relative position of the focus lens 12 from the focus cam excursion data as shown in FIG. 3.

In this case, if the focus lens 12 is driven when it is started to drive the zoom lens 10, the focus lens 12 may be affected by the inrush current induced by starting driving the zoom lens 10. To prevent the voltage drop of the power supply 86 from being induced by the inrush current, and prevent the number of images, which the image pickup apparatus 100 can photograph, from being decreased, such a control is executed that it is waited only for a time (hereinafter, referred to as inrush current time), in which the inrush current is flowing because it is started to drive the zoom lens 10, to drive the focus lens 12, and after that, it is started to drive the focus lens 12.

Zoom information (position, driving speed, and driving direction) is obtained in each predetermined cycle, the zoom lens position (focal distance) to which the zoom lens 10 moves by next cycle is estimated, and the focus lens 12 is controlled to the relative position, thereby, it is realized to follow the focus during the zooming. The arrowed solid line in FIG. 3 indicates a following operation of the focus cam.

When it is stopped to drive the zoom lens 10, the stopping is asynchronously notified with the above cycle, and even while the focus lens 12 is being controlled, it is stopped to drive the focus lens 12. After it is stopped to drive the zoom lens 10, the focus lens 12 is moved to the relative position corresponding to a position at which the zoom lens 10 is stopped, thereby, the zooming operation is completed.

As described above, by focusing just before starting the zooming, the appropriate focused condition can be constantly maintained during the zooming operation.

FIG. 4 is a flowchart illustrating a procedure of a focus driving (driving the focus lens 12) process, which is executed by the image pickup apparatus 100 in FIGS. 1A and 1B, during the zooming operation (driving the zoom lens 10).

In FIG. 4, when the zooming operation is instructed by the operating unit 70, the zoom driving is started by the relative operation controlling circuit 121 and the zoom controlling circuit 44 (step S100). Next, it is determined by the start timing controlling circuit 122 whether or not the inrush current time because of the zoom driving has passed over (step S101). That is, in the step S101, the start timing controlling circuit 122, which controls the control start timing for the focus lens 12, waits until the inrush current time because of the zooming passes over. When the inrush current time because of the zoom driving has passed over, it is determined whether or not the zooming stop (stopping the zoom lens 10) is instructed by the operating unit 70 (step S102). When the zooming stop is not instructed, a position of the zoom lens 10 is obtained, and the following control is executed which moves the focus lens 12 to a lens position based on the focus cam excursion (step S106).

When the zooming stop (stopping the zoom lens 10) is instructed by the operating unit 70 (YES to the step S102), it is stopped by the relative operation controlling circuit 121 to drive the focus lens 12 (step S103). Next, it is stopped by the relative operation controlling circuit 121 to drive the zoom lens 10 (step S104). After it is stopped in the step S104 to drive the zoom lens 10, the focus lens 12 is moved to the relative position (final position) corresponding to a position of the zoom lens 10 (step S105), followed by terminating the process.

Figure 5:
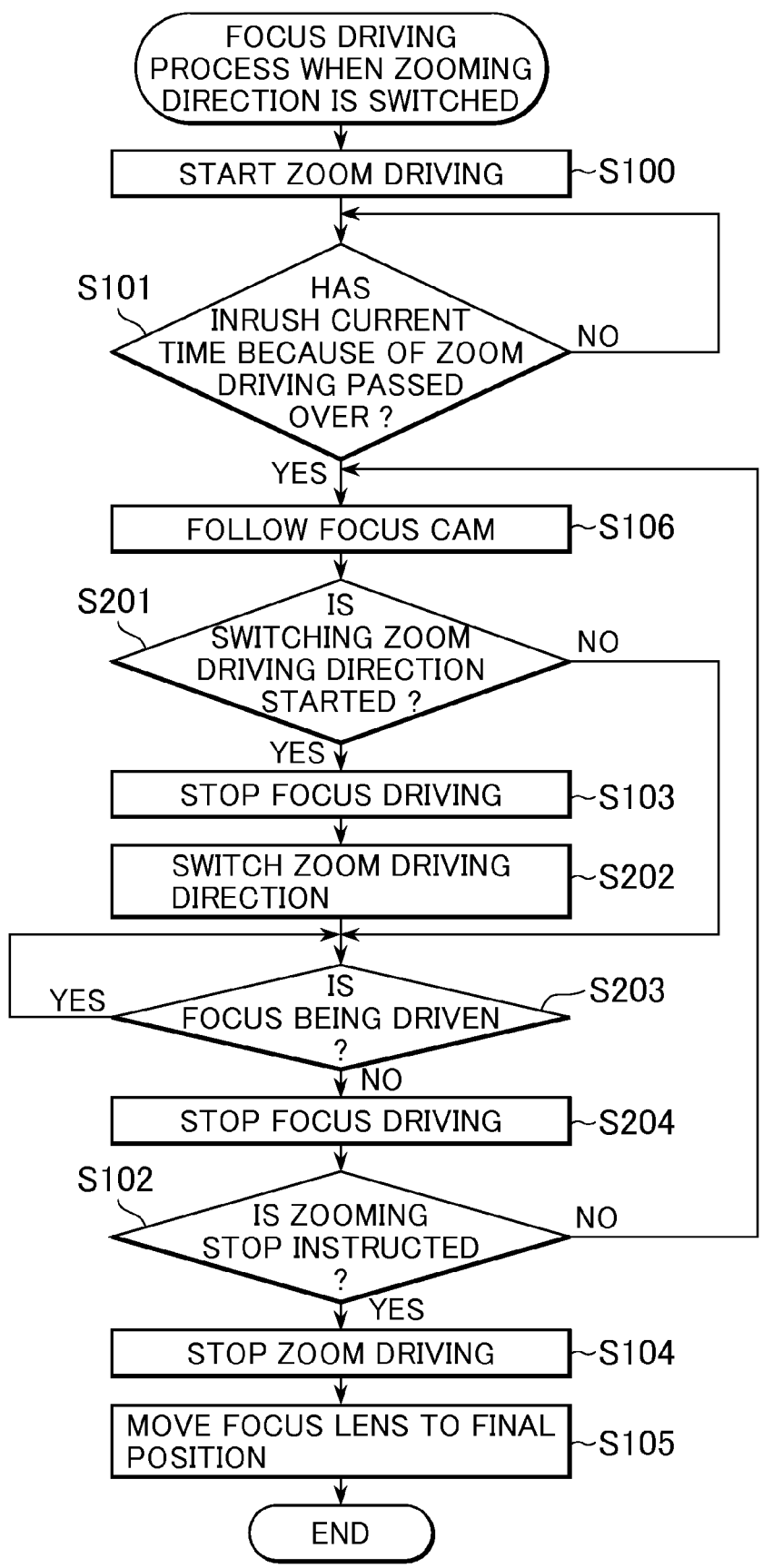
FIG. 5 is a flowchart illustrating the procedure of the focus driving process, which is executed by the image pickup apparatus in FIGS. 1A and 1B, when the zooming direction is switched.

FIG. 5 is a flowchart illustrating the procedure of the focus driving process, which is executed by the image pickup apparatus 100 in FIGS. 1A and 1B, when the zooming direction is switched. That is, FIG. 5 is a flowchart in which the focus is driven when the driving direction for the zoom lens 10 is switched during the zooming. Steps similar to those in FIG. 4 are designated by identical step numbers.

In FIG. 5, when the zooming operation is instructed by the operating unit 70, the zoom driving is started by the relative operation controlling circuit 121 and the zoom controlling circuit 44 (step S100). Next, it is determined by the start timing controlling circuit 122 whether or not the inrush current time because of the zoom driving has passed over (step S101). When the inrush current time because of the zoom driving has passed over, a position of the zoom lens 10 is obtained, and the following control is executed which moves the focus lens 12 to a lens position based on the focus cam excursion (step S106).

Next, it is determined whether or not an instruction for switching a driving direction for the zooming is inputted by the operating unit 70 (step S201). When the instruction for switching a driving direction for the zooming is inputted, it is stopped by the stop timing controlling circuit 123 to drive the focus lens 12 (step S103). When a predetermined time passes over after it has stopped to drive the focus lens 12, the driving direction for the zoom lens 10 is switched (step S202).

Here, after it is waited in the step S103 that the focus stopping process is completed, the driving direction for the zoom lens 10 is switched in the step S202. However, a time is previously stored at which the focus stopping process is completed, and after waiting for the completion time, the driving direction for the zoom lens 10 may be switched.

Next, it is determined whether or not the focus is being driven (step S203), and when the focus is not being driven, the focus drive stopping process is executed (step S204).

Then, it is determined whether or not it is instructed by the operating unit 70 to stop the zooming (stop the zoom lens 10) (step S102). When it is instructed by the operating unit 70 to stop the zooming, it is stopped to drive the zoom lens 10 (step S104). The focus lens 12 is moved to the relative position (final position) corresponding to a position of the zoom lens 10 (step S105), followed by terminating the process.

The above process flow is also applied to a one-side stopping process which stops the zoom lens 10 from the predetermined stop direction when the zooming operation is terminated.

After it is terminated to control to switch the driving direction for the zoom lens 10, when it is not instructed to stop the zooming (NO to the step S102), the process returns to step S106, and the following control is started again which moves the focus lens 12 to a lens position based on the focus cam excursion.

When it is not yet instructed to switch the driving direction for the zooming (NO to the step S201), and it is instructed to stop the zooming (YES to the step S102), as in the above process, the zooming operation is terminated.

Figure 6:
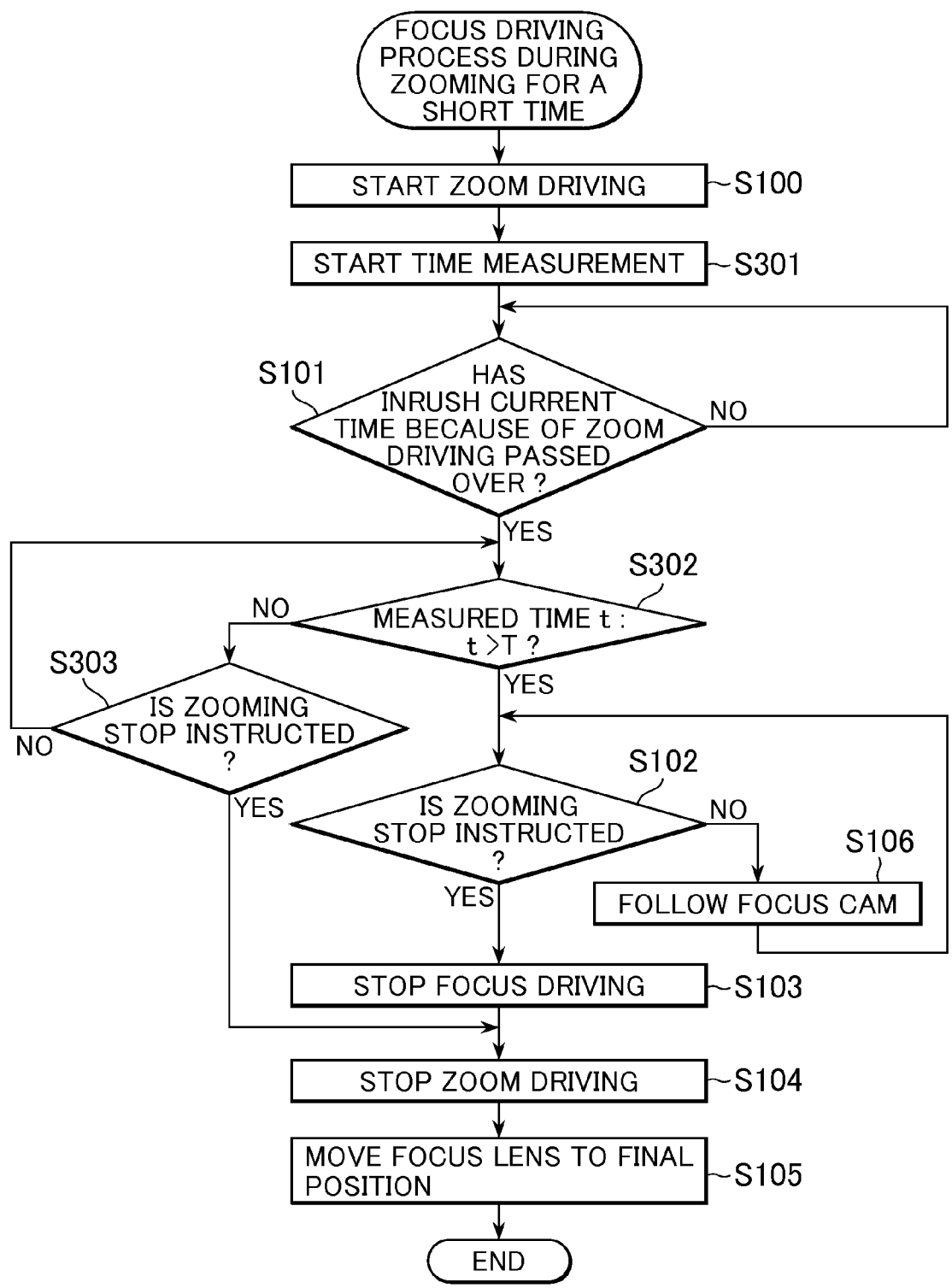
FIG. 6 is a flowchart illustrating the procedure of the focus driving process, which is executed by the image pickup apparatus in FIGS. 1A and 1B, while the zooming operation is executed for a short time.

FIG. 6 is a flowchart illustrating the procedure of the focus driving process, which is executed by the image pickup apparatus 100 in FIGS. 1A and 1B, while the zooming operation is executed for a short time. Specifically, FIG. 6 is a flowchart illustrating the focus driving operation during the zooming when the zooming operation is instructed only for a short time t by the operating unit 70. Steps similar to those in FIG. 4 are designated by identical step numbers.

In FIG. 6, when the zooming operation is instructed by the operating unit 70, the zoom driving is started by the relative operation controlling circuit 121 and the zoom controlling circuit 44 (step S100), and it is started to measure the time (step S301).

Next, it is determined by the start timing controlling circuit 122 whether or not the inrush current time because of the zoom driving has passed over (step S101), and when the inrush current time because of the zoom driving has passed over, it is determined whether or not the measured time t, which is started in the step S301, is longer than a predetermined time T (step S302).

When the measured time t is longer than the predetermined time T (YES to the step S302), it is determined whether or not it is instructed by the operating unit 70 to stop the zooming (stop the zoom lens 10) (step S102). Until it is instructed to stop the zooming (NO to the step S102), a position of the zoom lens 10 is obtained, and the following control is executed which moves the focus lens 12 to a lens position based on the focus cam excursion (step S106).

When it is instructed by the operating unit 70 to stop the zooming (YES to the step S102), it is stopped by the stop timing controlling circuit 123 of the relative operation controlling circuit 121 to drive the focus lens 12 (step S103), next, it is stopped to drive the zoom lens 10 (step S104).

After it is stopped in the step S104 to drive the zoom lens 10, the focus lens 12 is moved to the relative position (final position) corresponding to a position of the zoom lens 10 (step S105), followed by terminating the process.

When the measured time t is equal to or shorter than the predetermined time T (NO to the step S302), it is determined whether or not it is instructed by the operating unit 70 to stop the zooming (stop the zoom lens 10) (step S303). When it is not instructed to stop the zooming, the process returns to the step S302, and when it is instructed to stop the zooming, the process proceeds to the step S104, and it is stopped to drive the zoom lens 10.

Next, an exposure controlling method will be described which is executed when the object image is variably-magnified by the zoom tens 10.

Generally, in the zoom lens 10, since a diameter of an objective lens is constant, as the focal distance becomes longer, the open f-value becomes larger. Thus, if the variable-magnifying operation is executed by the zooming in the open aperture, the exposure is changed by the change of the f-value, so that it is necessary to also control the exposure during the zooming operation.

On the other hand, if the aperture is driven when it is started to drive the zoom lens 10, the aperture operation may be affected by the inrush current. To prevent the voltage drop of the power supply 86 from being induced by the inrush current, and prevent the number of images, which the image pickup apparatus 100 can photograph, from being decreased, it is determined by exposure control determining circuit 127 whether or not it is necessary to control the exposure with the aperture control before it is started to drive the zoom lens 10.

The above exposure control with the aperture control will be described.

In this exposure control, the maximum f-value change is estimated from the zoom position and the driving direction for the zooming when it is instructed to start the zoom driving. In addition, it is determined whether or not the exposure change which is induced when the exposure difference is added, can be controlled to be the proper exposure only by the control of the aperture shutter unit 13 and the gain amplifier 120 in the exposure condition when it is instructed to start the zoom driving. The influence because of smear or noise may be considered as the determination condition in this case.

FIG. 7 is a flowchart illustrating a procedure of an exposure controlling process, which is executed by the image pickup apparatus 100 in FIGS. 1A and 1B, while the zooming operation is executed.

In FIG. 7, when the zooming operation is instructed by the operating unit 70, the proper exposure and the exposure difference are calculated (step S401). Next, the f-value change is estimated by the exposure control determining circuit 127 from the current zoom position and the current driving direction for the zooming, and it is determined whether or not it is possible to control the exposure without controlling the aperture during the zooming, including the control for the exposure difference calculated in the step S401 (step S402).

Here, when it is determined that it is possible to control the exposure without controlling the aperture during the zooming (YES to the step S402), the zoom driving is started (step S100). On the other hand, when it is determined that it is impossible to control the exposure without controlling the aperture during the zooming, that is, when it is determined that it is possible to control the exposure by controlling the aperture during the zooming (NO to the step S402), the exposure is controlled with controlling the aperture (step S404), after that, the zoom driving is started (step S100).

After that, it is determined whether or not it is instructed by the operating unit 70 to stop the zooming (stop the zoom lens 10) (step S102), and when it is not instructed to stop the zooming, the exposure is controlled without controlling the aperture (step S405), and when it is instructed to stop the zooming, it is stopped to drive the zoom lens 10 (step S104). After the zoom driving is stopped in the step S104, the exposure is normally controlled (aperture control, shutter control, and gain control) (step S403), as a result, a level of the output signal is controlled, followed by terminating the process.

In the present embodiment, it has been described that any one of the focus lens 12 and aperture shutter unit 13 is caused to operate during the zoom driving. However, as illustrated in the timing chart shown in FIG. 8 when the zoom is driven, when the zooming operation is instructed, the focus driving process and the exposure controlling process may be concurrently executed.

In the present embodiment, while the aperture control is described, the same process is also executed for the natural density (ND) filter which reduces light quantity inputted from a lens and an aperture in a switching method for narrowing a diameter of a light flux.

According to the present embodiment, information on a position of the focus lens 12 corresponding to a position of the zoom lens 10, which is dependent on the object distance, is stored in the memory 30 as the focus cam excursion, and the focus lens 12 is moved based on the stored information. When the moving direction of the zoom lens 10 is switched, the moving direction of the zoom lens 10 is switched after the focus lens 12 is stopped, and after this switching, the focus lens 12 is moved based on the information stored in the memory 30. Thereby, it is possible to avoid the influence of the voltage drop of the power supply 86, and to follow the focal plane and control the exposure during variably-magnifying as downsizing and power-save the image pickup apparatus.

It is to be understood that an object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Moreover, it is to be understood that the functions of the above described embodiment may be accomplished by writing a program code read out from the storage medium into a memory provided on an expansion board inserted into a computer or in an expansion unit connected to the computer and them causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-207028, filed Aug. 8, 2007, which is hereby incorporated by reference herein in its entirety.

What is claimed is:

1. An image pickup apparatus comprising:
   a storing unit adapted to store information on a position of a focus lens corresponding to a position of a zoom lens, the position of the focus lens being dependent on an object distance; and
   a controlling unit adapted to obtain a position of the zoom lens in each predetermined cycle and estimate a position of the zoom lens to which the zoom lens moves by the next cycle, and subsequently move the focus lens based on the information stored in said storing unit with respect to the estimated position of the zoom lens,
   wherein, when a moving direction of the zoom lens is switched, said controlling unit stops the focus lens before the moving direction of the zoom lens is switched, and said controlling unit stops the focus lens upon reception of a stopping notification asynchronously with the predetermined cycle, and subsequently stops the zoom lens and moves the focus lens based on the information stored in said storing unit with respect to the position of the stopped zoom lens and then stops the focus lens.

2. An image pickup apparatus as claimed in claim 1, wherein, when the moving direction of the zoom lens is switched, said controlling unit is adapted to stop the focus lens to switch the moving direction of the zoom lens, and said controlling unit is adapted to move the focus lens based on the information stored in said storing unit after a lapse of a predetermined time period from the switching.

3. A non-transitory computer-readable storage medium storing a control program for controlling an image pickup apparatus, the control program comprising:

a storing module for storing information on a position of a focus lens corresponding to a position of a zoom lens, the position of the focus lens being dependent on an object distance; and a controlling module for obtaining a position of the zoom lens in each predetermined cycle and estimating a position of the zoom lens to which the zoom lens moves by the next cycle, and subsequently moving the focus lens based on the information stored by said storing module with respect to the estimated position of the zoom lens, wherein, when a moving direction of the zoom lens is switched, said controlling module stops the focus lens before the moving direction of the zoom lens is switched, and said controlling module stops the focus lens upon reception of a stopping notification asynchronously with the predetermined cycle, and subsequently stops the zoom lens and moves the focus lens based on the information stored in said storing module with respect to the position of the stopped zoom lens and then stops the focus lens.

* * * * *